3,322,627
METHOD OF TREATING HERPES SIMPLEX IN-
FECTIONS WITH 5-METHYLAMINO-2'-DEOXY-
URIDINE, AND COMPOSITIONS THEREFOR
Tsung-Ying Shen, Westfield, N.J., assignor to Merck &
Co., Inc., Rahway, N.J., a corporation of New Jersey
No Drawing. Filed Sept. 3, 1964, Ser. No. 394,336
17 Claims. (Cl. 167—59)

This invention relates to chemotherapeutic compositions and more particularly to antiviral chemotherapeutic compositions. Specifically, it relates to the use of 5-methylamino-2'-deoxy uridine in the treatment of herpes simplex virus ophthalmic infections and to novel compositions containing said compound.

Herpes simplex is a common virus known to cause a variety of inflammations in mammals, among which is herpes simplex keratitis, an affliction occurring in the eye. The malady is known to be very resistant and its causes are not entirely understood since the virus is usually found in the body under healthy conditions. It has been theorized that a variety of emotional, physiological, and nutritional factors contribute to the manifestation of the dormant herpes virus by rendering the host amendable to attack. Medical treatment of the virus inflammation has involved using a variety of chermotherapeutic agents with 5-iodo-2'-deoxy uridine (IDU) gaining some fairly wide acceptance in the field. In view of the usually resistive nature of the virus, investigatory medical research has been concerned with providing new agents for combatting the malady and it is therefore an object of this invention to provide such agents. It is another object of the invention to provide compositions which are useful in combatting herpes simplex keratitis and other eye inflammations.

According to the present invention, it has been discovered that the compound 5-methylamino-2'-deoxy uridine, its 3',5'-O-diacylated derivatives, and ophthalmically acceptable acid addition salts thereof, are highly specific, extremely selective antiviral agents effective on the herpes simplex virus and against herpes simplex keratitis. Structurally they are depicted as follows:

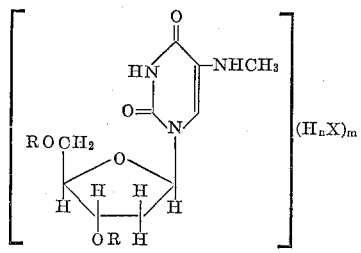

wherein R is hydrogen or an organic acyl radical, preferably alkanoyl, and exemplified by acetyl, propionyl, butryl, and the like, X is an anion, $n$ is a whole number corresponding to the valency of X, and $m$ is 0 or 1.

The most preferred material is the free compound 5-methylamino-2'-deoxy uridine, although, as indicated above, treatment may also be effected through the use of the ophthalmically acceptable acid addition salts of the free compound or of the 3',5'-O-diacylated derivatives thereof. As acids suitable for use there may be mentioned hydrochloric, citric, tartaric, sulfuric, phosphoric, acetic, boric, lactic, malic, gluconic acids, and the like, with the anions thereof corresponding to X in the foregoing structural formula. The 3',5'-O-diacyl radical may suitably be lower alkanoyl such as acetyl, propionyl, butyryl, and the like. Of these, acetyl is preferred.

It has been discovered that the above compounds possess a unique combination of very low cytotoxicity and high efficacy against herpes simplex, giving a very high therapeutic index of the order of five times or more than that of the conventionally employed 5-iodo-2'-deoxy uridine. This is extremely surprising in view of the fact that it has further been discovered that other 5-substituted-2'-deoxy uridines such as 5-amino-2'-deoxy uridine, 5-dimethylamino-2'-deoxy uridine, and 5-ethylamino-2'-deoxy uridine have been found to be either non-selective and inefficacious on herpes simplex or to have a high cytotoxicity rendering them unusable for the purpose of treating the herpes infection.

In one aspect of the invention it is contemplated to provide compositions containing an effective amount of 5 - methylamino - 2' - deoxy uridine in an ophthalmically pharmaceutically acceptable vehicle. In general, the type of vehicle employed will depend, in part, upon the mode of treatment selected for treating the infection. Thus, an ointment type of composition may be employed as well as an aqueous solution of the medicament. Where an ointment is involved, the composition comprises, in addition to the methylamino compound, a well tolerated base normally used in ophthalmic applications. Suitably there may be employed solid paraffin (white petrolatum) or mixtures of solid paraffin with liquid paraffin (mineral oil) as the bases. When mixtures are employed, suitable weight percent ranges are 10–60% mineral oil and 40–90% solid petrolatum. The actual amount of methylamino compound in the mixture should be sufficient to provide an effective amount of the drug to the host in a convenient volume of applied composition. On a weight basis, this may suitably be achieved when the methylamino compound comprises from 0.01 to 1.0% of the entire composition with 0.05 to 0.5% being preferred.

The methylamino compound is very stable, water soluble material and is thus particularly amendable to preparation as a liquid composition. Administration as a liquid is the preferred method of the present invention, and hence liquid compositions are the preferred compositions. Thus contemplated, the present invention encompasses an aqueous solution of 5-methylamino-2'-deoxy uridine, containing sufficient salts to be essentially isotonic and having a pH approximating that of human tears, a value within the range of from 6.5 to 7.5.

As indicated above, with respect to the ointment type of composition, sufficient methylamino compound should be present in solution to provide an effective quantity in a convenient volume of applied solution so as to render administration to the host not overly burdensome. Concentrations of about 0.1 mg. to 10.0 mg. per ml. of solution, and preferably from 0.5 mg. to 5.0 mg., are suitable for this purpose. The salts employed may be any commonly used to provide isotonicity such as sodium citrate, sodium borate, sodium chloride, and the like, and preferably sodium chloride, and are suitably present within the range of from 1.0 to 30.0 mg. per ml. and preferably 5 mg. to 15 mg. when sodium chloride is used. The pH of the solution may be adjusted to a value within the above range by adding acid thereto. The acids employed may be typically ophthalmically non-irritating acids at the levels employed such as citric, acetic, boric, phosphoric, lactic, malic, gluconic, hydrochloric, tartaric, sulfuric, and the like, preferably hydrochloric acid, and present in an amount sufficient to adjust the pH within the range of 6.5 to 7.5. When acids are added, the methylamino compound will exist at least in part as the corresponding acid addition salt. In this regard, it may be mentioned that the same acids may be employed as were described previously in connection with the formation of the acid addition salts of the methylamino compound. Furthermore, if the acid addition salts are used as the starting compound, the pH may be adjusted as above with acid or, if necessary, through the further addition of either the free methylamino compound or some other ophthalmically acceptable material.

Additionally, the compositions, both liquid and ointment, may also include other ingredients well known in the pharmaceutical art, particularly the topical medicine field, such as stabilizer, anti-oxidants, preservatives such as thimerosal, viscosity aids such as methyl cellulose, and the like, as desired. They may then be topically administered to the infected host animal.

The actual absolute amount of medicament supplied to the host will depend on a variety of factors, among which are severity of infection, general health and age of the host, and the like, all well within the domain of those skilled in the art and easily ascertained by them.

Additionally, the compositions of the present invention may include one or more of other active drugs in the appropriate form, e.g., free compound, esters thereof, and the like to provide a composition of wide spectrum activity. For example, there may be employed antiinflammatory materials such as dexamethasone, hydrocortisone, prednisolone, indomethacin, and the like. When so included, the particular afflictions associated with the additional drugs, further in consideration of the efficacy of the drugs, will dictate the relative concentration of the active ingredients.

The 3′,5′-di-O-acyl compounds may be prepared by treating the 5-methylamino-2′-deoxy uridine in acetic acid with 2 moles of the appropriate acyl halide at a temperature of from 0° C. to room temperature and the product crystallized from the reaction mixture by the addition of a selective solvent such as ether thereto. Thus, when acetyl chloride is employed as the acyl halide, the 3′,5′-di-O-acetyl compound is obtained. In a similar manner, the propionyl and butyryl derivatives are obtained.

The following examples are given for the purpose of illustration only and not by way of limitation.

Example 1

The following is an example showing the preparation of an ophthalmic solution containing 5-methylamino-2′-deoxy uridine. The following ingredients are selected:

5-methylamino-2′-deoxy uridine _____ mg__ 100
Sodium chloride _____ mg__ 900
Thimerosal (sodium merthiolate) _____ mg__ 4
Hydrochloric acid _____ q.s. pH 6.8
Water for injection _____ q.s. to 100 ml.

The 5-methylamino-2′-deoxy uridine is dissolved along with sodium chloride and thimerosal in about 80% of the volume of the water. The pH of this solution is then adjusted to about 6.8 with hydrochloric acid. An additional quantity of water is then added so as to adjust the volume to 100 ml. The solution is then sterilized by filtration through a bacteria retentive filter and subdivided aseptically into sterile dropper vials. Sterile dropper fitments are then attached, giving an assembly containing a solution suitable for ophthalmic use and which is sterile, isotonic, preserved, and adjusted to the approximate pH of tears.

Example 2

5-methylamino-2′-deoxy uridine _____ mg__ 500
Sodium citrate _____ mg__ 3000
Thimerosal _____ mg__ 4
Hydrochloric acid _____ q.s. pH 7.0
Water for injection _____ q.s. to 100 ml.

The 5-methylamino-2′-deoxy uridine, sodium citrate, and thimerosal are dissolved in about 80% of the water. The pH is adjusted to 7.0 with hydrochloric acid and sufficient water is added to adjust the volume to 100 ml. The mixture is then sterilized and subdivided as in Example 1.

Example 3

5-methylamino-2′-deoxy uridine _____ g__ 0.1
White petrolatum _____ g__ 70.0
Mineral oil _____ g__ 30.0

The white petrolatum is melted and the mineral oil added thereto. The solution is mixed thoroughly and allowed to cool at room temperature. The 5-methylamino-2′-deoxy uridine is incorporated by levigation. The composition is then filled into standard ophthalmic ointment tubes and sealed.

Example 4

Dexamethasone phosphate _____ g__ 0.10
5-methylamino-2′-deoxy uridine _____ g__ 0.10
Sodium citrate _____ g__ 1.00
Ethylenediamine tetraacetate disodium (stabilizer)
                                              g__ 0.05
Creatinine (stabilizer) _____ g__ 0.50
Benzalkonium chloride (preservative) _____ g__ 0.02
Polysorbate 80 (stabilizer) _____ g__ 0.20
Hydrochloric acid _____ q.s. pH 7.0
Water for injection _____ q.s. 100.00 ml.

The dexamethasone phosphate, 5-methylamino-2′-deoxy uridine, sodium citrate, ethylenediamine tetraacetate disodium, creatinine, polysorbate 80, and benzalkonium chloride are dissolved in about 80% of volume. The pH is adjusted to 7.0 with hydrochloric acid and sufficient water added to adjust the volume to 100 ml. The mixture is then sterilized and subdivided as in Example 1.

Example 5

Dexamethasone phosphate _____ g__ 0.1
5-methylamino-2′-deoxy uridine _____ g__ 0.1
White petrolatum _____ g__ 70.0
Mineral oil _____ g__ 30.0

The white petrolatum is melted and the mineral oil added thereto. The solution is mixed thoroughly and allowed to cool to room temperature. The 5-methylamino-2′-deoxy uridine and dexamethasone phosphate are then incorporated by levigation. The composition is then filled into standard ophthalmic ointment tubes.

Example 6

5-methylamino-2′-deoxy uridine is tested against herpes simplex, strain McIntyre, and the inhibition of growth of the test virus measured at various levels of test compound concentration. The 5-methylamino-2′-deoxy uridine is found to be totally effective at a level of 5γ/ml. whereas in the same test 5-iodo-2′-deoxy uridine is effective at a concentration of 20γ/ml. The cytotoxicity for 5-methylamino-2′-deoxy uridine is found to be much greater than 2500γ/ml., whereas the cytotoxic level for the iodo compound is 2500γ/ml. indicating a much higher tolerance for the methylamino compound than the iodo compound. The calculated therapeutic index for the methylamino compound is greater than 512 as opposed to 128 for the iodo compound.

Any departure from the above description which conforms to the present invention is intended to be included within the scope of the claims.

What is claimed is:

1. The method for treating herpes simplex eye infections which comprises contacting a host animal affected with a herpes simplex eye infection at the infected site with a chemotherapeutically effective amount of a compound selected from the group consisting of 5-methylamino-2′-deoxy uridine, its 3′,5′-di-O-acylated derivatives, and opthalmically acceptable acid addition salts thereof.

2. The method according to claim 1 wherein the compound is 5-methylamino-2′-deoxy uridine.

3. The method according to claim 1 wherein the compound is 3′,5′-di-O-acetyl-5-methylamino-2′-deoxy uridine.

4. The method according to claim 1 wherein the compound is 3′,5′-di-O-acetyl-5-methylamino-2′deoxy uridine hydrochloride.

5. The method according to claim 1 wherein the compound is an acid addition salt of 5-methylamino-2′-deoxy uridine.

6. The method according to claim 5 wherein the acid is selected from the group consisting of hydrochloric, sulfuric, citric, tartaric, phosphoric, acetic, boric, lactic, malic, and gluconic acids.

7. The method according to claim 6 wherein the acid is hydrochloric.

8. A composition comprising a compound selected from the group consisting of 5-methylamino-2′-deoxy uridine, its 3′,5′-di-O-acyl derivatives and ophthalmically acceptable acid addition salts thereof intimately admixed with an ophthalmically acceptable vehicle, in which said uridine compound comprises 0.01 to 1.0% by weight of the entire composition.

9. The composition according to claim 8 wherein the ophthalmically acceptable vehicle comprises solid petrolatum, liquid petrolatum, and mixtures thereof.

10. The composition according to claim 9 wherein the compound is 5-methylamino-2′-deoxy uridine.

11. The composition according to claim 10 wherein a mixture of solid petrolatum and liquid petrolatum is employed, said mixture comprising from 10–60 weight percent of liquid petrolatum and from 40–90 weight percent solid petrolatum.

12. A composition comprising water and a compound selected from the group consisting of 5-methylamino-2′-deoxy uridine, its 3′,5′-di-O-acyl derivatives and ophthalmically acceptable acid addition salts thereof in which said uridine compound comprises 0.01 to 1.0 mg. per ml. of solution, said composition being essentially isotonic and having a pH in the range of from 6.5 to 7.5.

13. The composition according to claim 12 wherein the compound is 5-methylamino-2′-deoxy uridine hydrochloride.

14. The composition according to claim 12 wherein the methylamino compound is an acid addition salt of 5-methylamino-2′-deoxy uridine wherein the acid is selected from the group consisting of hydrochloric, sulfuric, citric, tartaric, phosphoric, acetic, boric, lactic, malic, and gluconic acids.

15. The composition according to claim 14 wherein the compound is 5-methylamino-2′-deoxy uridine.

16. A composition comprising water, 5-methylamino-2′-deoxy uridine and an acid selected from the group consisting of hydrochloric, sulfuric, citric, tartaric, phosphoric, acetic, boric, lactic, malic, and gluconic acids, in which said uridine compound comprises 0.01 to 1.0% by weight of the entire composition, said composition being essentially isotonic and having a pH between 6.5 and 7.5.

17. The composition according to claim 16 wherein the acid is hydrochloric acid.

References Cited

Chemical Abstracts I, vol. 58, entry 852a, 1963, citing Kaufman et al., Invest Ophthalmol, 1, 686–92 (1962).

Chemical Abstracts II, vol. 60, entry 5910e, 1964, citing Visser et al., Biochem. Biophys. Acta, 76, 463–5 (1963).

Remington: Practice of Pharmacy, 12th ed., published by Mack Publishing Co., Easton, Pa., 1961, pp. 359–365, 1334 and 1335.

LEWIS GOTTS, *Primary Examiner.*

RICHARD L. HUFF, *Assistant Examiner.*